United States Patent
Forshey et al.

(10) Patent No.: US 6,997,053 B2
(45) Date of Patent: Feb. 14, 2006

(54) SYSTEMS AND METHODS FOR MEASUREMENT OF LOW LIQUID FLOW RATES

(75) Inventors: Randy G. Forshey, Discovery Bay, CA (US); Peter M. Pozniak, San Jose, CA (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 10/650,170

(22) Filed: Aug. 27, 2003

(65) Prior Publication Data

US 2005/0044951 A1    Mar. 3, 2005

(51) Int. Cl.
*G01F 23/20*    (2006.01)
(52) U.S. Cl. ........................................ 73/296
(58) Field of Classification Search ................ 137/386, 137/141, 198; 73/290 R, 296, 299, 215
See application file for complete search history.

(56) References Cited

U.S. PATENT DOCUMENTS 6,484,565 B1 *   11/2002   Shin et al. ................. 73/54.01

* cited by examiner

*Primary Examiner*—Harshad Patel
*Assistant Examiner*—Corey D. Mack
(74) *Attorney, Agent, or Firm*—David A. Hey

(57) ABSTRACT

The invention relates to systems and methods of measuring low liquid flow rates. The system provides a controller, flow system components, and one or more load cells coupled to a collection vessel. The collection vessel includes a weir that serves as a passage to allow liquid to rise within the weir until the liquid overflows the weir. After the liquid supplied passes a hydraulic stabilization period the controller captures a load cell signal and opens a timing window. At the end of the timing window the controller captures another load cell signal. A controller calculates the mass of the collected liquid over the collection period and the flow rate such as mass rate and/or the volumetric rate. The duration of the timing window depends on the measurement desired. Since the liquid wells up and overflows the weir, the system can make precise measurements of low flow rates. In another feature, feedback control mechanisms are implemented in the batch constant flow method or steady state constant flow method. In both methods, the instantaneous measured flow rate is compared with an input command derived from flow rate calibration, sending an error correction feedback signal to the controlled valves to actuate the flow rate of liquid supply and the drain and the gas pressure, until zero error or an acceptable error margin is reached or the desired flow rate is established.

14 Claims, 7 Drawing Sheets

SYSTEMS AND METHODS FOR MEASUREMENT OF LOW LIQUID FLOW RATES

BACKGROUND

The present invention relates to the measurement of liquid flow rates.

Semiconductor manufacturers, the health industry, the food industry and others require accurate measurement of low liquid flow rates. Low liquid flow rates tend to break up into a series of droplets of small volume. As the desired accuracy approaches the droplet volume, measurements become unreliable.

U.S. Pat. No. 4,869,722 describes a device that tries to address this problem by monitoring the droplets released from the tip of a drop funnel 13 onto a liquid at the top of a reaction cell 16. The reaction cell 16 senses the impact of the droplet, but the user cannot readily control the droplet size or flow rate and the measurements are susceptible to environmental change and minor physical perturbations. The droplet size cannot change without altering the funnel opening diameter, and the liquid flow rate changes with variations in liquid supply height. Sampling of a droplet is also inaccurate if the droplet forms at the funnel opening due to surface tension or falls in mid-air before impact between measurement intervals. This method is also unsuitable for measuring higher liquid flow rates not forming droplets, thus limiting its applications.

U.S. Pat. No. 4,244,218 and U.S. Pat. No. 6,026,683 use the buoyancy principle to measure liquid level and flow rate. Those methods are not suitable for very low flow rate measurements where error tolerances exceed the droplet or sub-droplet range. Floatation devices have delicate mechanical parts prone to calibration errors and physical damage, adding to manufacturing and maintenance costs.

SUMMARY OF THE INVENTION

The invention relates to the measurement of liquid flow rates. In an embodiment, the invention provides a controller, flow control components such as valves, and one or more load cells coupled to a collection vessel with a weir allowing a liquid to fill the collection vessel. The liquid supplied to the weir rises within the weir until the liquid overflows the weir. The collection vessel is usually vented during filling to relieve back pressure and a pressurized gas can be used to facilitate draining.

In another feature, liquid is supplied and after a hydraulic stabilization period, the controller captures a load cell signal and opens a timing window. At the end of the timing window the controller captures another load cell signal. The controller calculates the mass of the collected liquid over the collection period and the flow rate such as mass rate and/or the volumetric rate. The duration of the timing window depends on the measurement desired. Since the liquid wells up and overflows the weir, the system can make precise measurements of low flow rates.

In another feature, feedback control is implemented in a batch constant flow method or steady state constant flow method. In both methods, the instantaneous measured flow rate is compared with an input command, e.g., derived from flow rate calibration, sending an error correction feedback signal to the controllable valves to adjust the flow rate of the liquid supply, the drain and the gas pressure, until error correction feedback signal is with an acceptable predetermined error margin and/or the desired flow rate is established.

The liquid flow rate measurement systems and methods are sensitive and well suited to measure low flow rates. The systems and methods can scale, if desired, to measure a wide range of liquid flow rates including a range of viscosities. The liquid flow rate system is simple, rugged, and low cost to manufacture, and relatively immune to environmental change and minor physical perturbation.

DETAILED DESCRIPTION OF THE PREFERRED EMBODIMENTS

The following description includes the best mode of carrying out the invention. The detailed description is made for the purpose of illustrating the general principles of the invention and should not be taken in a limiting sense. The scope of the invention is determined by reference to the claims.

Figure 1:
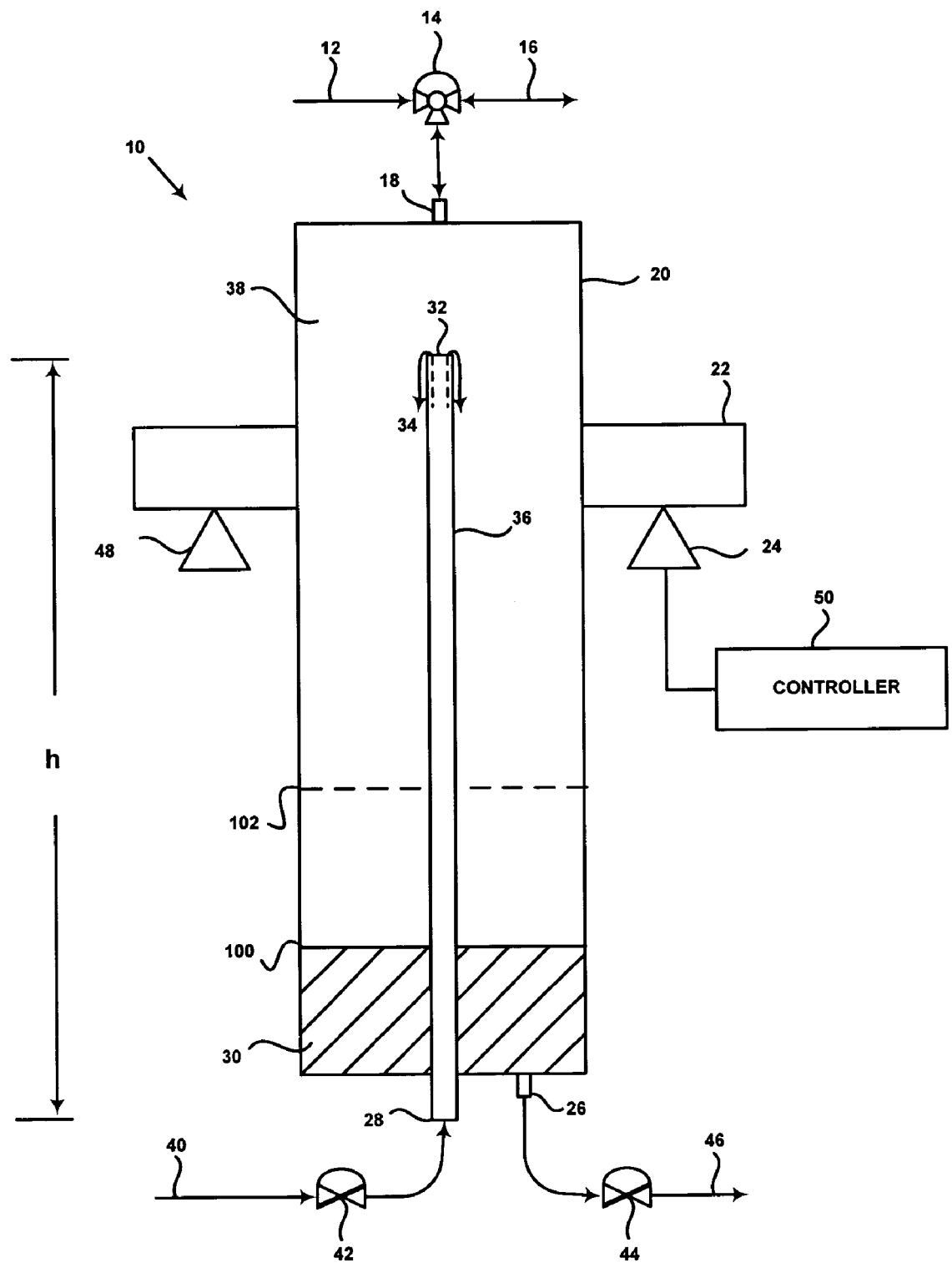
FIG. 1 is an embodiment of a system for liquid flow rate measurement. It also illustrates a batch method with start and stop liquid levels over a time interval.

FIG. 1 illustrates an embodiment of a system for low liquid flow rate measurement. The system 10 includes a weir 36 disposed in a collection vessel 20. The weir 36 of height h provides a passage for liquid supplied from a liquid supply inlet 28 to a weir opening 32 disposed above the floor of the collection vessel 20. It is not essential that the bottom of the weir 36 extend beyond the bottom of the collection vessel 20 as depicted. It could also extend from the bottom of the collection vessel 20. The collection vessel 20 and the weir 36 are preferably made of a light weight material with low surface tension and chemically non-reactive and/or corrosion resistant with respect to the collected liquid 30 such as polypropylene or a Teflon® coated material. However, stainless steel and other materials durable, sufficiently rigid and chemically compatible with the chemicals being measured can be used.

In operation, liquid is supplied through a supply line 40 into the collection vessel 20 at a pressure that exceeds the weir pressure, the internal atmospheric pressure, and line friction. This generates liquid flow through an open two-way supply valve 42 into the liquid supply inlet 28 leading to the weir opening 32. Once at the weir opening 32, the liquid overflows the weir 36 in downward direction 34 to form collected liquid 30 preferably without breaking up into drops or droplets. If the weir 36 is a column or tube disposed vertically and centered in a cylindrical-shaped collection vessel 20 as depicted, the arrangement will distribute the load symmetrically across the illustrated first and second load cells 24, 48. In an alternative embodiment, the weir 36 need not be centered with respect to the collection vessel 20.

A drain 26 located at the bottom of the collection vessel 20 regulates the liquid level. The liquid level can be adjusted by a manual, periodic, or feed-back controlled drain through a two-way drain valve 44 to a drain line 46. In an embodiment, the collected liquid 30 is drained by gravity through the drain line 46.

Depending on the volatility of the liquid being measured, it may be necessary to maintain the internal gas pressure 38 of the collection vessel 20 at higher than atmospheric pressure during operation by supplying a pressurized non-reactive gas 12 into the collection vessel 20. A three-way valve 14 controls the supply of gas into the gas inlet or vent 18. The non-reactive gas 12 is preferably inert to the liquid being measured to avoid affecting the accuracy of the low liquid flow rate measurements. The same gas inlet or vent 18 can be used to vent the internal gas pressure 38 through the three-way valve 14.

In an embodiment, the collection vessel 20 together with the collected liquid 30 rests upon a set of load cells 24, 48 through the vessel support 22. Alternatively, the system uses a single load cell or more than two load cells. One suitable load cell is the Scaime load cell model no. F60X10C610E. The load cells 24, 48 output an analog electrical signal such as a voltage that indicates the total mass $M_{total}$ sensed by the load cell(s). The analog electrical signal is captured by a controller 50 that includes a computer and typically includes an analog-to-digital conversion function with stored calibration information, where a digital signal is generated for further processing or used for generating a digital display. It is not considered essential to the invention regarding the type of controller 50 that is used. One suitable controller 50 is the Mitsubishi FX2N programmable logic controller with a known conventional analog-to-digital converter. In an alternative embodiment, controllers without analog-to-digital converters may be used along with load cells outputting digital signals directly into controllers.

The controller 50 computes the mass of collected liquid 30, $M_{liquid}$ by storing a known mass for the empty collection vessel 20 or reading the output value of the load cells 24, 48 when the collection vessel 20 is empty and resting on the support 22. We will refer to the mass of the empty collection vessel as $M_{empty}$. After this is known, the controller 50 can read the output value from load cells 24, 48 representing the total mass $M_{total}$ when the collection vessel 20 contains collected liquid 30, and subtract to find $M_{liquid}$:

$$M_{liquid} = M_{total} - M_{empty}$$

The mass flow rate m of collected liquid 30 is calculated by computing the change in mass $\Delta M$ over an interval of time $\Delta T$. A detailed description of flow rate measurements will be presented below. The volume of the collected liquid 30 is given by the density relationship:

$$V = M_{liquid}/\rho$$

Where V is the liquid volume, $M_{liquid}$ is the mass of the collected liquid 30, and $\rho$ is the liquid density.

The controller 50 can use the density relationship to calculate the volumetric flow rate Q of the collected liquid 30 along with the computation of the change in mass $\Delta M$ over an interval of time $\Delta T$.

Figure 2:
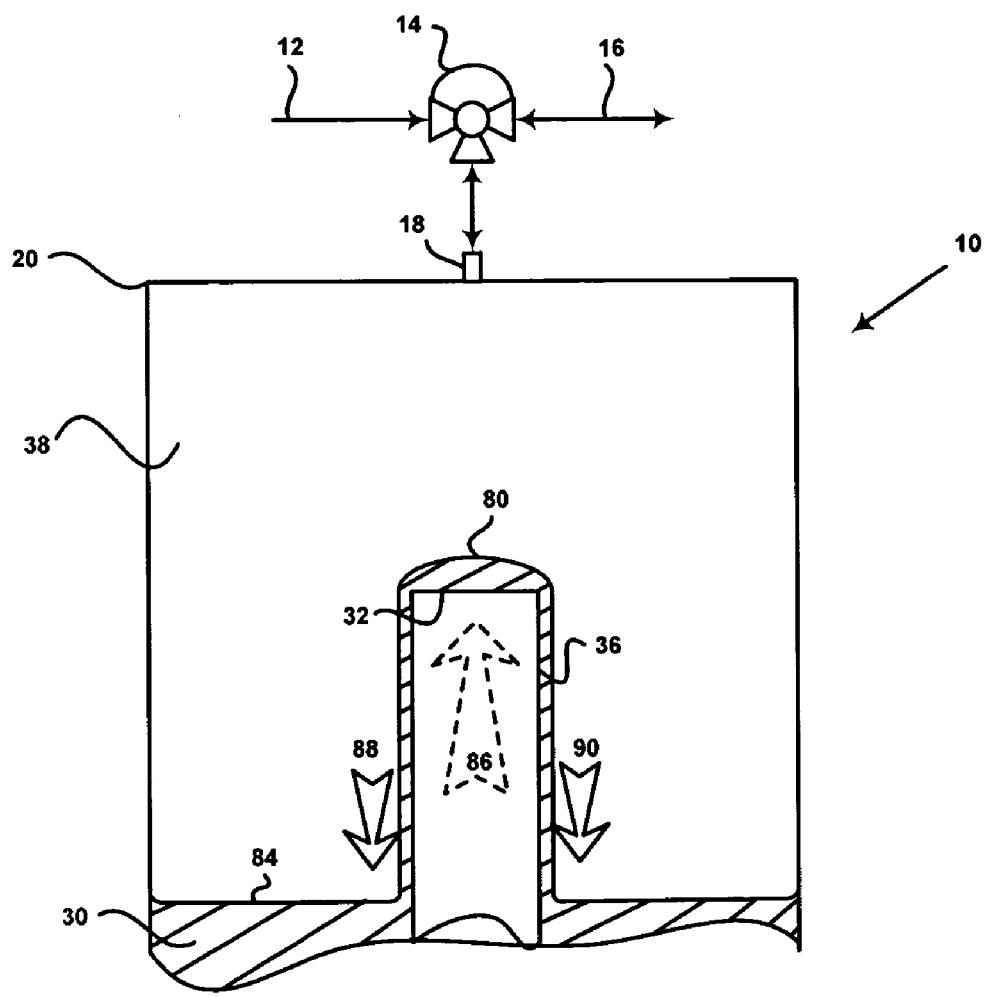
FIG. 2 is an enlarged view of the system showing liquid movement at the top of the weir.

FIG. 2 is an enlarged view of part of the system shown in FIG. 1. It shows the upward liquid movement 86 inside the weir 36 with liquid build up 80 at the weir opening 32. The liquid build up 80 overcomes the liquid surface tension and overflows the weir 36 in the downward direction 88, 90 due to gravity and flows along the surrounding wall of the weir 36 and reaches the surface 84 of the collected liquid 30. A stream of liquid is established and collected in the collection vessel 20. This method reduces or eliminates loss of liquid from mist or droplets during a liquid flow rate measurement.

Depending on the volatility or flammability of the liquid being measured, the internal gas pressure 38 is regulated with either a pressurized non-reactive gas 12 or vented through the gas inlet or vent 18 and the three-way valve 14. In an embodiment, the gas inlet or vent 18 is normally vented through the three-way valve 14 during the filling process while a pressurized non-reactive gas 12 is pumped into the collection vessel 20 during a drain process.

Figure 3:
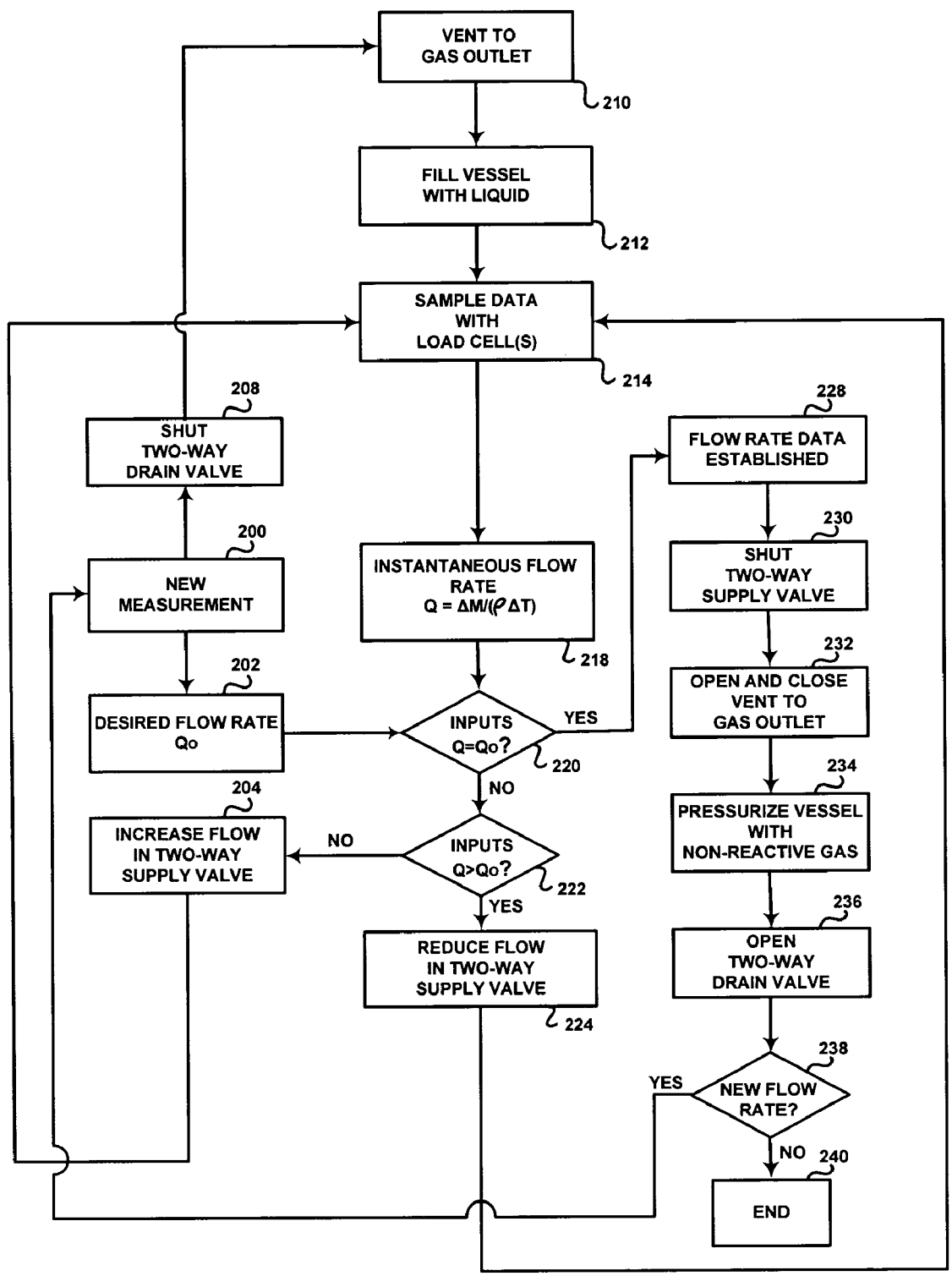
FIG. 3 is a flow chart of a batch method of flow rate measurement.

FIG. 3 is a flow chart of a batch method of flow rate measurement to implement in the system shown in FIGS. 1–2. It should be recognized that the method can occur sequentially, concurrently, in parallel, or in pipeline fashion. For brevity, the method will now be described as carried out sequentially. To begin the method, the controller 50 will initiate a new flow rate measurement at step 200. At step 202, the controller 50 will store the desired flow rate Qo. At step 208, the collected liquid 30 in the collection vessel 20 is drained below a predetermined level and the two-way drain valve 44 closed for the duration of the flow rate measurement. At step 210, the controller 50 sends a control signal to the three-way valve 14 to allow the gas in the collection vessel 20 to vent through the gas outlet line 16 to relieve back pressure while liquid fills the collection vessel 20. At step 212, the controller 50 sends a control signal to the two-way supply valve 42 to fill the collection vessel 20 with liquid from the supply line 40. At step 214 and after a short stabilization period, the controller 50 captures (i.e., samples) an instantaneous load cell signal from the one or more load cells 24, 48 opening a timing window. At the end of the timing window the controller 50 again captures (i.e., samples) the instantaneous load cell signal. The timing window can be various time periods depending on the accuracy required during the filling process. At step 218, the controller 50 converts the captured (i.e., sampled) load cell signals which represent the mass of the collected liquid 30 over the timing window to an instantaneous flow rate Q.

At step 220, the controller 50 executes a decision block that compares the instantaneous flow rate Q with the desired flow rate Qo. If the instantaneous flow rate Q is higher than the desired flow rate Qo, the controller 50 sends a control signal to reduce the opening of the two-way supply valve 42 to reduce the amount of liquid supplied to the collection vessel 20 at step 224. Conversely, if the instantaneous flow rate Q is less than the desired flow rate Qo, the controller 50 sends a control signal to open the two-way supply valve at step 204. In either condition the controller 50 measures and compares the instantaneous flow rate Q with the desired flow rate Qo in steps 214 to 220 until the instantaneous flow rate Q reaches the desired flow rate Qo.

When the instantaneous flow rate Q equals the desired flow rate Qo, the flow rate data is known and the controller 50 stores that data in memory at step 228, and at step 230 the controller 50 sends a control signal to shut the two-way supply valve 42 to cut the supply of the liquid into the collection vessel 20. At step 232, the controller 50 sends a control signal to open the three-way valve 14 to vent the gas from the collection vessel 20 through the gas outlet line 16 and then closes the three-way valve 14. At step 234, the controller 50 sends a control signal to open the three-way valve 14 to supply a non-reactive gas 12 into the collection vessel 20. At step 236, the controller 50 sends a control signal to open two-way drain valve 44 to drain out the liquid. If it is decided that another new flow rate measurement is required at step 238, the flow rate measurement method can be repeated beginning again at step 200 to establish a series of calibration curves for a wide range of flow rates. Otherwise, the flow rate measurement method terminates at step 240.

Figure 4:
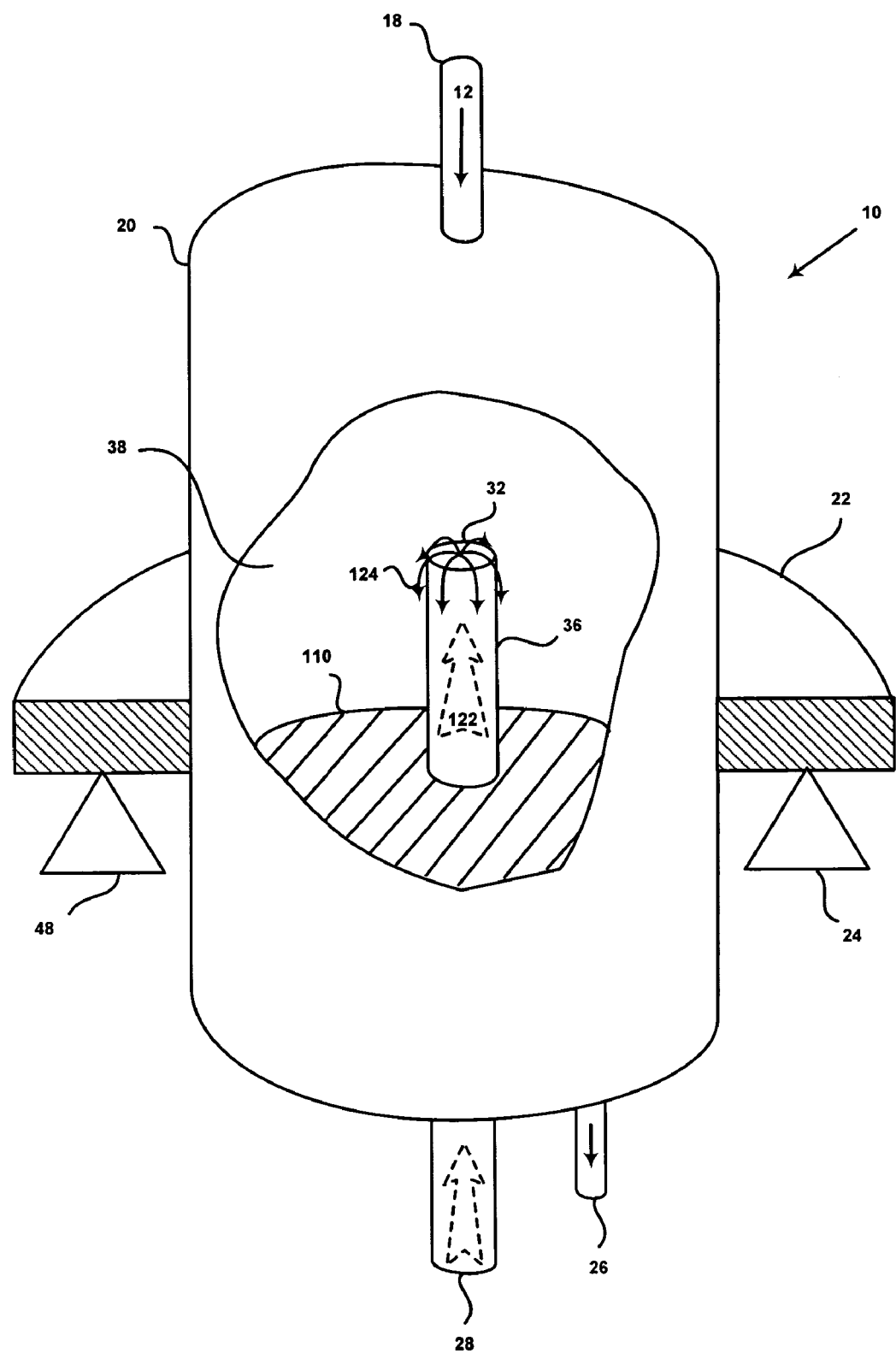
FIG. 4 is a perspective view of an embodiment of the system showing liquid paths at the collection vessel.

FIG. 4 is a partial cut-away and a perspective view of an embodiment of the system 10 showing the liquid pumped from liquid supply inlet 28 (FIG. 1) into a weir 36. The liquid rises upward 122 in the weir 36, builds up at the weir opening 32, and overflows downward 124 in all directions while clinging to the outside wall of the weir 36 to the liquid surface 110 inside the collection vessel 20. In an embodiment the system operates in a batch flow rate measurement environment where the filling process terminates and draining process through the drain 26 begins at a certain liquid level 110 below the top opening of the weir 32. In order to offset the decreasing drain flow rate due to the receding liquid level 110 where a progressive vacuum is generated over time, a pressurized non-reactive gas 12 is pumped into the collection vessel 20 through the gas inlet 18. By increasing the pressure of internal gas atmosphere 38 over time, the drain rate can be compensated to achieve substantially constant flow rate when a feedback control mechanism is used.

Embodiments of feedback control mechanism to achieve constant drain flow rate in batch method flow or steady state flow delivery will be discussed in FIG. 5. The liquid collected or flow rate is monitored by the set of load cells 24, 48 under the vessel support 22.

The weir 36 also acts as a damper to dampen minor physical perturbation to the collected liquid during measurements. The ratio of the diameters of the column weir 36 and the collection vessel 20 determines the dampening effect. Without any moving part in the system 10, the system 10 is relatively rugged and less susceptible to errors or physical damages.

The weir 36 and the collection vessel 20 can be made using low surface tension construction material such as polypropylene. If the weir 36 is a tube, the exact diameter of the weir 36 can be calculated from the relationships below. An optimal weir diameter $\phi_c$ design will permit measuring the flow rate of Newtonian fluid class of liquids of very wide range of viscosities. A Newtonian fluid has a constant viscosity at all shear rates at a constant temperature and pressure, and can be described by a one-parameter rheological model. An equation describing a Newtonian fluid is given below:

$$\tau = \mu \gamma$$

Where $\tau$ is the shear stress, $\mu$ is the viscosity and $\gamma$ is the shear rate.

Assuming that the Hagen-Poiseuille law is applicable (see C. V. Easwaran and S. L. Kokal, SIAM J. Appl. Math., 52, 1501, 1992), the rate of flow through the weir 36 (acting as a capillary tube) is given as follows:

$$Q = (\pi \Delta P \phi_c^4)(128 \mu h)$$

$$\Delta P = \rho g h + P_f + P_I$$

Where $\Delta P$ is the pressure difference, i.e. the liquid pump pressure, required to overcome weir pressure $\rho g h$, liquid friction $P_f$ in the delivery system and the internal atmospheric pressure $P_I$,
 $\rho$ is the density of the liquid,
 g is the gravitational constant,
 h is the weir height,
 $P_f$ is the liquid friction in the delivery system,
 $P_I$ is the internal gas pressure,
 $\phi_c$ is the inner diameter of the weir,
 $\mu$ is the viscosity of the liquid, and
 h is the weir height, Since the density $\rho$, the gravitational constant g, the weir height h, weir inner diameter $\phi_c$ are constant, the flow rate Q will be directly proportional to $\Delta P$ and inversely proportional to $\mu$. If the viscosity $\mu$ of the liquid increases or decreases by a certain factor, to maintain the same flow rate Q, the pump pressure $\Delta P$ will need to be increased or decreased by the same factor provided that the liquid to be delivered is a Newtonian fluid. Likewise, the flow rate Q can be increased or decreased by increasing or decreasing the pump pressure $\Delta P$, provided that the flow rate is kept at a level not forming undue mist or droplets in the gas above the collected liquid 30.

Referring again to FIG. 1 shows a system 10 suitable for carrying out a batch method of liquid flow rate measurement. A suitable pump such as a peristaltic pump (not shown) is used to pump the liquid through the supply line 40 at substantially constant pressure through the two-way supply valve 42 into the liquid supply inlet 28 into the bottom of the weir 36. A steady flow is established where the two-way drain valve 44 is closed during the measurements. A set of load cells 24, 48 coupled to the vessel support 22 record the instantaneous total mass $M_1$ of the collection vessel 20 that includes the collected liquid 30 at the start time liquid level represented by the solid line 100. The instantaneous mass of the liquid at this time is $M_{liquid} = (M_{total} - M_{empty})$. The mass $M_1$ at time $T_1$ is then sampled and converted into digital format for the controller 50. The mass $M_2$ at time $T_2$ is then sampled when the level of the collected liquid 30 rises to the dotted line 102. This second mass measurement can be sampled and converted into digital format for the controller 50. In order to reduce error of the measured value of the mass flow rate the system 10 can take many samples over small time periods using the same technique. The liquid flow rate Q is derived by the mass change recorded by the load cells 24, 48 over the predetermined time interval.

The fluid volume change over time can be then calculated from the product of mass change over time and a constant term of liquid density.

$$\Delta V = \Delta M / \rho = (M_2 - M_1) / \rho$$

wherein $\Delta M$ is the mass change over time interval $T_2$ and $T_1$ reflecting the net mass gained by the liquid in the collection vessel 20 over the predetermined time interval, $\rho$ is the liquid density, and $M_2$, $M_1$ are the measured total mass data from the load cells 24, 48 over time interval $T_2$ and $T_1$.

The liquid flow rate Q can be defined as the liquid volume change over an interval of time.

$$Q = \Delta V / \Delta T = (V_2 - V_1)/(T_2 - T_1)$$

Where Q is the liquid flow rate,
 $\Delta V$ is the liquid volume change over time interval $T_2$ and $T_1$, and
 $\Delta T$ is the time interval over final measurement $T_2$ and start measurement $T_1$.

By substitution, flow rate is determined as follows:

$$Q = \Delta M / (\rho \Delta T) = (M_2 - M_1)/(\rho(T_2 - T_1))$$

Where an assumption is made that the liquid physical properties remain substantially unchanged during the course of measurements.

The instantaneous volume information can be determined by the instantaneous mass data recorded by the load cells 24, 48, using the relationship described above:

$$V = M_{liquid}/\rho$$

Where at time instant T, $M_{liquid} = M_{total} - M_{empty}$

Figure 5:
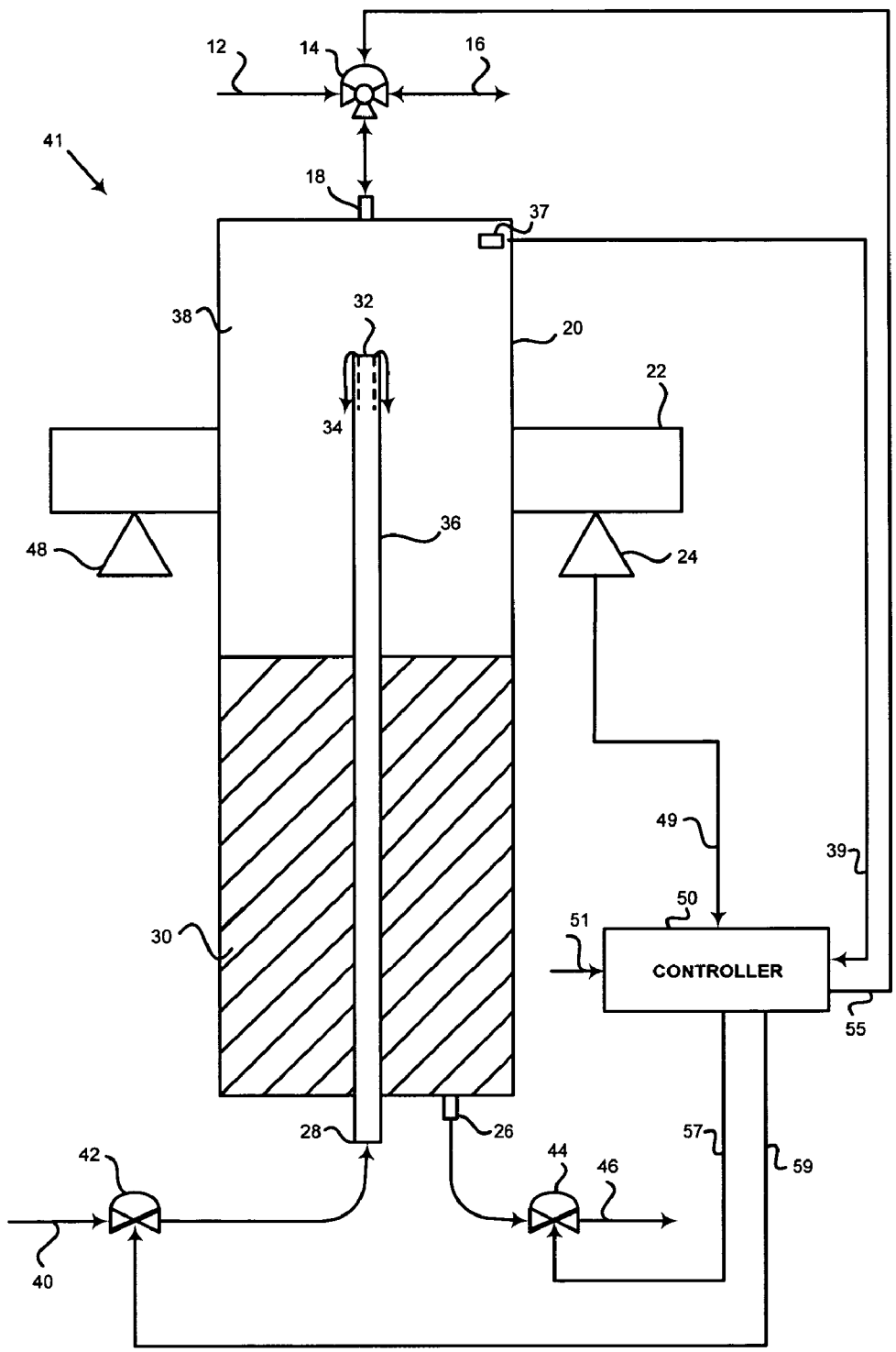
FIG. 5 illustrates an embodiment of the system showing a system for liquid flow rate measurement. It also illustrates a feedback control mechanism.

FIG. 5 is an embodiment of a liquid flow rate measurement system 41 using feedback control methods. The theory of feedback control is well known, thus the description will only describe how the system implements feedback control.

In an embodiment, the liquid flow rate measurement system 41 describes a batch feedback control flow method. The controller 50 receives the inputs 39, 49, and 51, and outputs the feedback control signals 55, 57. The controller 50 sends the feedback control signals 55, 57 to the corresponding three-way valve 14 and two-way drain valve 44. A pressure sensor 37 generates the input 39 indicating the gas pressure in the collection vessel 20. The load cells 24, 48 provide an input 49 indicating the mass of the collection vessel 20 with any collected liquid. Input 51 indicates the desired flow rate Qo. The magnitude of the feedback control signals 55, 57 corresponds to the difference between the sums of inputs 39, 49 and the input 51.

In order to maintain the drain line 46 at constant drain rate in a batch method, the feedback control signal 55 actuates the three-way valve 14 to adjust the pressure in the collection vessel 20 by introducing a non-reactive gas 12 into the gas inlet 18 to compensate for a flow rate decrease from a receding liquid level. The feedback control signal 57 actuates the two-way drain valve 44 to increase or decrease the drain rate of the collected liquid 30 through the drain line 46. A constant drain rate is reached when the feedback control signals 55, 57 are close to zero indicating that the decrease in mass of the collected liquid over a specified time achieves the drain liquid flow rate within a predetermined error margin.

Figure 6A:
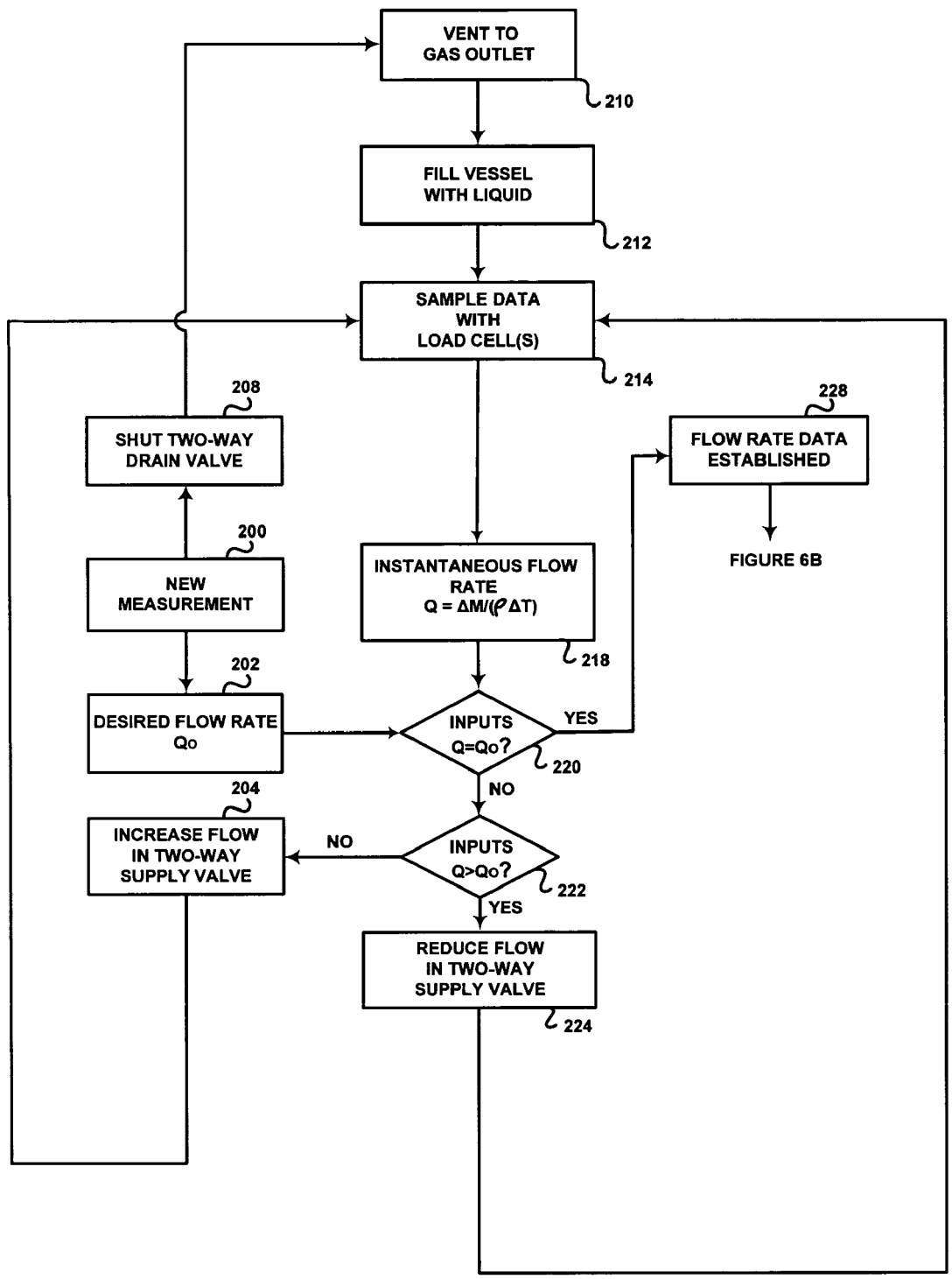
FIG. 6A is a flow chart illustrating a batch method for liquid flow rate measurement prior to the feedback control methods of FIG. 6B.

In another embodiment, the liquid flow rate measurement system 41 can be used to implement a steady state feedback control flow method. During steady state, the amount of liquid supplied into the collection vessel 20 and the amount of liquid drained out of the collection vessel 20 are equal or within a predetermined error margin. At or near zero mass change over time occurs and is recorded during the steady state method. Therefore, the desired flow rate is preferably established in the collection vessel 20 before the steady state constant flow method begins as illustrated in the flow chart as shown in FIG. 6A.

As shown in FIG. 5, inputs 39, 49, 51 are fed into the controller 50. It should be pointed out that during steady state the feedback control signal 59 is sent to keep open the two-way supply valve 42 at the established supply flow rate during the entire method. The controller 50 maintains the drain rate constant by transmitting the feedback control signals 55 and 57 with an error magnitude based on the difference between the sum of inputs 39, 49 and input 51 to the corresponding valves.

The feedback control signal 55 actuates the three-way valve 14 to increase or decrease the internal gas pressure 38 in the collection vessel 20. The feedback control signal 57 actuates the two-way drain valve 44 to increase or decrease the drain rates of the collected liquid 30 through the drain line 46. The feedback control signal 59 is kept within a predetermined error margin when reaching the desired flow rate unless a new flow rate command input 51 is sent to the controller 50 to actuate the two-way supply valve 42 to adjust the flow rate of the liquid into inlet 28. Once a new flow rate command input 51 is executed, the controller 50 will actuate the internal gas pressure through the three-way valve 14 and actuate the two-way drain valve 44 to drain liquid at the liquid supply flow rate. At steady state, an equilibrium liquid supply and drain flow rate is reached at the desired liquid flow rate when feedback control signals 55, 57 and 59 are all close to zero, wherein the total mass change over time will be at zero or within an acceptable error margin.

The feedback control signals 55, 57, 59 produce offsetting effects to reduce the magnitude of the error. The magnitude of error margin depends on factors such as the stability of the properties of the liquid during measurements, the shock or perturbation isolation design, the physical susceptibility design to environmental perturbation, the response time of the feedback loop versus sampling rate, the sensitivity of the hydraulic system, the sensitivity of the load cells 24, 48, the mass ratio of collected liquid 30 to the combined total mass of the liquid flow rate measurement system 41 including the collected liquid 30 and the collection vessel 20 and the sampling error.

For the sake of comparing the performance of the liquid delivery system we will assume: (1) the physical properties of liquid are substantially unchanged over a reasonable range of temperature variation, (2) the response time of the feedback loop is many orders faster than the mass sampling rate, (3) the hydraulic condition of the liquid supply and the drain pumping systems can be maintained at reasonably constant pressure condition, and (4) the load cells are capable of minute mass change detection. Assuming these conditions are met then optimizing the following considerations will also help improve the system: (1) the overall system sensitivity based on the ratio of the mass of collected liquid to the collection vessel should be as high as possible, and (2) the sampling errors and the susceptibility to environmental physical perturbation should be minimized.

In one embodiment, the collection vessel 20 is constructed of light weight material such as polypropylene. Therefore, the mass of the collected liquid 30 becomes dominant in the low flow rate measurements. The size of the collection vessel 20 can be scaled up or down to measure a wide range of liquid flow rate with high accuracy, hence the overall system sensitivity is high. Since the flow rate measurement is a continuous flow method that avoids forming droplets in the collection vessel 20, there are little or no missing droplets that contribute to sampling errors. Finally the weir 36 in the collection vessel 20 dampens the liquid movement in response to some minor environmental physical perturbations and there is no moving part in the mass detection method.

Figure 6B:
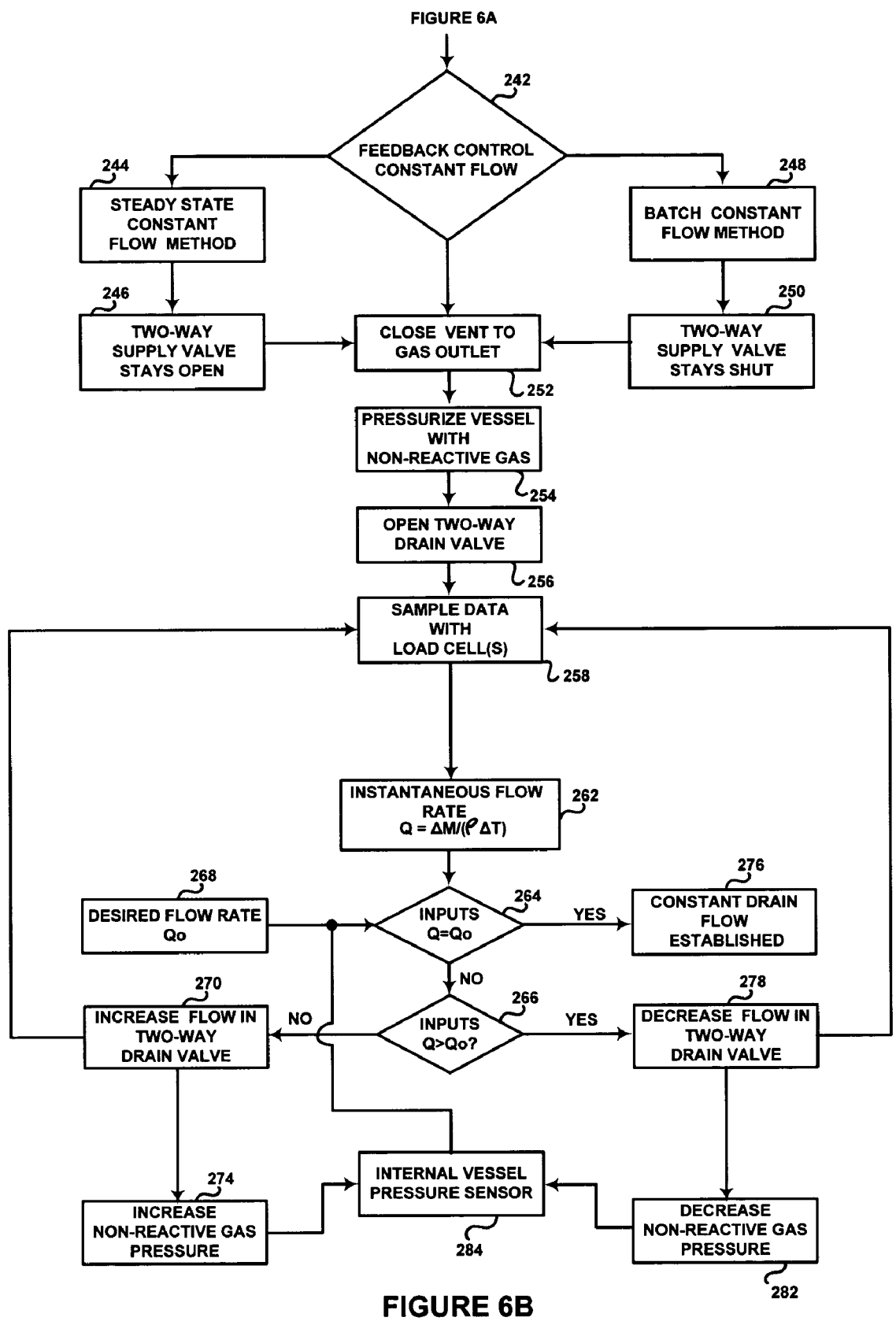
FIG. 6B is a continuation of FIG. 6B and illustrates two feedback control methods that can be implemented.

FIG. 6A and FIG. 6B illustrate two feedback control methods: (1) a batch constant flow method and (2) a steady state constant flow method that were described in connection with FIG. 5.

FIG. 6A is identical to FIG. 3 up to step 228. This means the desired flow rate Qo has been established before proceeding to either of the feedback control methods illustrated in FIG. 6B. Thus, the collected liquid 30 should reach a certain level in the collection vessel 20 and the collected liquid 30 can be drained at the desired flow rate Qo and maintained constant and steady throughout either feedback method.

FIG. 6B illustrates the two feedback control methods starting at step 242. The steady state constant flow method 244 and the batch constant flow method 248 share common steps such as previously described steps 252, 254, 256, 258, and 262 but have certain differences. The first difference is the two-way supply valve 42 stays open at step 246 for the liquid during the steady state constant flow method, while the two-way supply valve 42 stays shut at step 250 during the batch constant flow method. The second difference is the liquid level remains substantially unchanged throughout the entire steady state constant flow method, because the amount of liquid drained out will be constantly replenished by the same supply flow rate Qo without interruption while in the batch constant flow method, the liquid level will decrease at the desired flow rate Qo until all the collected liquid 30 in the collection vessel 20 is fully depleted or the method is terminated since the depleted collected liquid 30 is not replenished in the batch method.

Another difference is the steady state constant flow method will read a net zero mass change from the load cells indicating a constant flow rate where the instantaneous flow rate Q is equal to the desired flow rate Qo at step 264 while the batch constant flow method will read a mass decrease from the load cells indicating an instantaneous constant flow rate Q equal to the desired flow rate Qo.

Accordingly, in both feedback control methods the internal gas pressure 38 in the collection vessel 20 will be adjusted by supplying or venting a gas such as non-reactive gas 12 in step 274 or step 282, and the two-way drain valve will be actuated in step 270 or step 278 to maintain a constant flow rate at the desired flow rate Qo. If a new flow rate command change Qn is received during either the batch constant flow method or the steady state constant flow method, the methods will respond to the perturbation by actuating the flow rate to the collection vessel 20 according to the steps shown in FIG. 6B until the instantaneous flow rate Q matches the desired new flow rate Qn within an acceptable error margin.

What is claimed is:

1. The system for measuring flow rate of a liquid, comprising:
   a collection vessel coupled to a supply valve and to a drain valve;
   a weir providing a passage for the liquid into the collection vessel, wherein the liquid travels from the bottom to the top of the weir and overflows into the collection vessel;
   a load cell coupled to the collection vessel and generating a load cell signal indicating the mass of the collection vessel with the collected liquid;
   a controller for converting the load cell signal to indicate the liquid flow rate into the collection vessel; and
   a gas valve coupled to the collection vessel, wherein the controller sends an electronic signal to actuate the gas valve to vent the collection vessel or supply a non-reactive gas to the collection vessel.

2. The system of claim 1, wherein the liquid supply valve and the drain valve are controllable by actuation in response to electronic signals from the controller.

3. The system of claim 1, further comprising a gas pressure sensor generating an electronic signal indicating the gas pressure of the collection vessel to the controller.

4. The system of claim 1, wherein the change in the non-reactive gas pressure generates a change in the liquid flow rate into the collection vessel in response to electronic signals from the controller.

5. The system of claim 1, wherein the load cell signal is either an electronic analog signal or a digital signal.

6. The system of claim 1, wherein the controller samples the load cell signal after a stabilization period and converts the load cell signals to indicate liquid flow rate into the collection vessel.

7. The system of claim 1, wherein the controller generates feedback error signals by comparing the liquid flow rate into the collection vessel with a liquid flow rate desired, wherein the feedback error signals actuate the gas valve, the supply valve and/or the drain valve until the feedback error signal is within a predetermined error margin and the liquid flow rate is within a predetermined range of the liquid flow rate desired.

8. A system for measuring flow rate of a liquid, comprising:
   a collection vessel coupled to a supply valve and to a drain valve;
   a weir providing a passage for the liquid into the collection vessel, wherein the liquid travels from the bottom to the top of the weir and overflows into the collection vessel;
   a load cell coupled to the collection vessel and generating a load cell signal indicating the mass of the collection vessel with the collected liquid; and
   a controller for converting the load cell signal to indicate the liquid flow rate into the collection vessel;
   wherein the weir includes a column or tube wherein the top of the weir is above the bottom of the collection vessel; and
   wherein the liquid is pumped from the bottom of the weir at a constant pressure producing a gradual overflow at the top of the weir into the collection vessel by gravity without formation of mist or droplets.

9. A method of measuring the flow rate of a liquid, comprising:
   providing a weir for a passage into a collection vessel;
   supplying liquid to the weir so the liquid overflows the weir and collects in the collection vessel;
   generating a load cell signal indicating the mass of the collection vessel with the liquid collected;
   converting the load cell signal to indicate the flow rate of the liquid into the collection vessel;
   providing a liquid supply valve and a drain valve controllable by actuation in response to electronic signals from a controller; and
   sending an electronic signal from the controller to actuate a gas valve to vent the collection vessel or supply a non-reactive gas to the collection vessel.

10. The method of claim 9, further comprising generating an electronic signal indicating the gas pressure of the collection vessel to the controller.

11. The method of claim 9, further comprising changing the non-reactive gas pressure to vary the liquid flow rate into the collection vessel.

12. The method of claim 9, further comprising sampling the load cell signal after a stabilization period and converting the load cell signals to indicate liquid flow rate into the collection vessel.

13. A method of measuring the flow rate of a liquid, comprising:
   providing a weir for a passage into a collection vessel;
   supplying liquid to the weir so the liquid overflows the weir and collects in the collection vessel;
   generating a load cell signal indicating the mass of the collection vessel with the liquid collected;
   converting the load cell signal to indicate the flow rate of the liquid into the collection vessel; and
   supplying the liquid from the bottom of the weir at a constant pressure producing an overflow at the top of the weir into the collection vessel by gravity without formation of mist or droplets.

14. A method of measuring the flow rate of a liquid, comprising:
- providing a weir for a passage into a collection vessel;
- supplying liquid to the weir so the liquid overflows the weir and collects in the collection vessel;
- generating a load cell signal indicating the mass of the collection vessel with the liquid collected;
- converting the load cell signal to indicate the flow rate of the liquid into the collection vessel; and
- generating feedback error signals by comparing the liquid flow rate into the collection vessel with a liquid flow rate desired, wherein the feedback error signals actuate a gas valve, a supply valve and/or a drain valve until the feedback error signal is within a predetermined error margin and the liquid flow rate is within a predetermined range of the liquid flow rate desired.

* * * * *

UNITED STATES PATENT AND TRADEMARK OFFICE
CERTIFICATE OF CORRECTION

| | | |
|---|---|---|
| PATENT NO. | : 6,997,053 B2 | Page 1 of 1 |
| APPLICATION NO. | : 10/650170 | |
| DATED | : February 14, 2006 | |
| INVENTOR(S) | : Randy G. Forshey and Peter M. Pozniak | |

It is certified that error appears in the above-identified patent and that said Letters Patent is hereby corrected as shown below:

Column 9, line 34, replace "The" with --A--

Signed and Sealed this

Eighth Day of May, 2007

JON W. DUDAS
*Director of the United States Patent and Trademark Office*